(12) United States Patent
Fujino et al.

(10) Patent No.: US 7,433,646 B2
(45) Date of Patent: Oct. 7, 2008

(54) LEARNING SUPPORT METHOD AND LEARNING SUPPORT PROGRAM

(75) Inventors: Akio Fujino, Ota (JP); Hiroshi Inagawa, Ota (JP); Tomohisa Misawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 55 days.

(21) Appl. No.: 10/345,990

(22) Filed: Jan. 17, 2003

(65) Prior Publication Data

US 2003/0186210 A1    Oct. 2, 2003

(30) Foreign Application Priority Data

Mar. 27, 2002    (JP) .............................. 2002-087521

(51) Int. Cl.
*G09B 11/00* (2006.01)

(52) U.S. Cl. .................. 434/350; 434/118; 434/322

(58) Field of Classification Search ................. 434/118, 434/169, 178, 322, 323, 350, 353, 365
See application file for complete search history.

(56) References Cited

U.S. PATENT DOCUMENTS

| | | | |
|---|---|---|---|
| 6,139,330 A * | 10/2000 | Ho et al. ..................... 434/322 |
| 6,461,166 B1 * | 10/2002 | Berman ....................... 434/323 |
| 6,606,480 B1 * | 8/2003 | L'Allier et al. .............. 434/362 |
| 6,932,612 B2 * | 8/2005 | Kamikawa et al. .......... 434/322 |
| 2002/0087496 A1 * | 7/2002 | Stirpe et al. ................... 706/45 |
| 2002/0138456 A1 * | 9/2002 | Levy et al. ..................... 706/25 |
| 2003/0055842 A1 * | 3/2003 | Fields et al. .............. 707/104.1 |
| 2003/0180700 A1 * | 9/2003 | Barry et al. .................. 434/350 |
| 2003/0186209 A1 * | 10/2003 | Kamikawa et al. .......... 434/350 |

* cited by examiner

*Primary Examiner*—Kathleen Mosser
(74) *Attorney, Agent, or Firm*—Staas & Halsey LLP

(57) ABSTRACT

Disclosed is a learning support method with a server computer. Presupposed keywords corresponding to subjects that should have been acquired by a learner before attending a learning course and learning keywords corresponding to subjects that will be acquired by attending the learning course are defined for the learning course. The learning material is developed in module basis. Presupposed keywords corresponding to subjects that should have been acquired by a learner before learning the module and learning keywords corresponding to subjects that will be acquired by learning the module are defined for each module. The server computer selects a module whose learning keywords match the learning keywords of the learning course attended by a leaner and whose presupposed keywords match the keywords corresponding to subjects that have been learned by the learner, supplying the module to the learner.

8 Claims, 9 Drawing Sheets

FIG.3

<Module DB 12>

| Module ID | A01 |
|---|---|
| Module Name | ... |
| Learning Time | 30 min |
| Learning Keyword | a,b |
| Presupposed Keyword | x,y |
| Entity | ... |

FIG.4

<Glossary DB 13>

| Keyword | Explanation |
|---|---|
| ... | ... |

FIG.5

<Learning History DB 14>

| Learner ID | ABC0063 | |
|---|---|---|
| Acquired Keyword | Date and Time of Learning | Acquired Method |
| x | 2002.2.14.13.00.00.00 | 0 |
| y | a,b | 0 |
| z | x,y | 1 |

FIG.13

<Learning Keyword Table 15>

| Learning Keyword | Attribute | Deletion Flag |
|---|---|---|
| a | 0 | 0 |
| b | 0 | 0 |
| c | 1 | 1 |

FIG.14

<Acquired Keyword Table 16>

| Acquired Keyword | Registration Flag | Date and Time of Resistration |
|---|---|---|
| x | 0 | 2002.2.14.13.00.00.00 |
| y | 1 | |
| z | 2 | |

FIG.15

<Candidate Table 17>

| Missing Presupposed Keyword Number | Extracted Keyword Number | Module ID |
|---|---|---|

FIG.16

<Log 18>

| Module ID | M1 |
|---|---|
| Date and Time of Learning | 2002.2.20.00.00.00 |
| Title of Learning Course | AAA |
| Chapter Number | 3 |
| Just Previous Module ID | M5 |
| Evaluation Value | 4 |

LEARNING SUPPORT METHOD AND LEARNING SUPPORT PROGRAM

BACKGROUND OF THE INVENTION

1. Field of the Invention

The present invention relates to a learning support method and a learning support program in so-called "e-Learning" system.

2. Prior Art

In late years, the learning support system with a network and the World Wide Web technology has been developed. A learner (a student) is able to attend a learning course opened on the Web through a Web browser. Accordingly, a learner can study in a desired time at a desired place without limitations of time and place.

However, since a learner studies learning materials of a desired learning course in an order of a predetermined curriculum according to a conventional learning support method, the learner has to study contents even if the learner has already learned the contents. Further, when a part of the contents of the attended learning course may be difficult for a learner, it is difficult to continue attending the learning course.

SUMMARY OF THE INVENTION

An object of the present invention is to provide a leaning support method and a learning support program that enable to supply a desired learning material in consideration of a background knowledge of a learner.

For the above object, according to a first aspect of the present invention, there is provided a learning support method with a server computer having a storage in which module information for each of modules of learning material including presupposed keywords corresponding to subjects that should have been acquired by a learner before learning the module and learning keywords corresponding to subjects that will be acquired by learning the module is stored. The method includes an extracting step for extracting keywords that do not match acquired keywords corresponding to subjects that have been already learned among keywords corresponding to the subjects that should be learned, when the computer receives the keywords corresponding to subject that should be learned and the acquired keywords from a client machine, and a selecting step for selecting a module that satisfies first and second requirements. The first requirement is that a learning keyword included in the module information matches one of the extracted keywords and the second requirement is that a presupposed keyword included in the module information matches one of the acquired keywords.

With this method, a module that includes keywords that should be learned as learning keywords and keywords that have been already learned as presupposed keyword is selected. Therefore, a learner can study the contents in the learning course effectively without learning contents that have been learned again.

According to a second aspect of the present invention, there is provided a learning support method with a server computer whose storage holds skeleton information for each of learning courses and module information for each of modules of learning material. The skeleton information includes one or more presupposed keywords corresponding to subjects that should have been acquired by a learner before attending the learning course and one or more learning keywords corresponding to subjects that will be acquired by attending the learning course. The module information includes one or more presupposed keywords corresponding to subjects that should have been acquired by a learner before learning the module and one or more learning keywords corresponding to subjects that will be acquired by learning the module. The storage can store history information including one or more acquired keywords corresponding to subjects that have been learned by a learner, the server computer being able to connect with a client computer of a learner. The method includes an extracting step for extracting keywords that do not match the acquired keywords of a learner among the learning keywords of the learning course attended by the learner, a selecting step for selecting one or more modules satisfying first and second requirements, and a first learning step for transmitting one of the modules selected at the selecting step and for adding the learning keywords of the transmitted module to the history information as the acquired keywords when one or more modules are found at the selecting step. The first requirement is that a learning keyword included in the module information matches one of the extracted keywords and the second requirement is that a presupposed keyword included in the module information matches one of the acquired keywords of the learner.

The transmitted module may be chosen from the modules satisfying the first and second requirements so that the number of the learning keywords included in the module information that match the learning keywords of the learning course becomes largest.

The method of the second aspect may further includes a designating step for designating missing keywords that do not match the acquired keywords of the learner among the presupposed keywords of the module chosen from the modules satisfying the first requirement when no module satisfies the first and second requirements but one or more modules satisfy the first requirement only, a specifying step for specifying modules whose learning keywords included in the module information match one of the missing keywords and the presupposed keywords thereof match one of the acquired keywords of the learner, and a second learning step for transmitting one of the modules selected from the modules specified at the specifying step and for adding the learning keywords of the transmitted module to the history information as the acquired keywords when one or more modules are found at the specifying step.

The above described methods are also available as a computer program executed on the server computer or the system consisting of the server computer and the program thereof.

DESCRIPTION OF THE ACCOMPANYING DRAWINGS

FIG. 3 is a table showing a data layout of a module DB;

FIG. 4 is a table showing a data layout of a glossary DB;

FIG. 5 is a table showing a data layout of a learning history DB;

FIG. 13 shows a learning keyword table;

FIG. 14 shows an acquired keyword table;

FIG. 15 shows a candidate table;

FIG. 16 shows a log; and

DESCRIPTION OF THE PREFERRED EMBODIMENTS

Figures 1, 2:
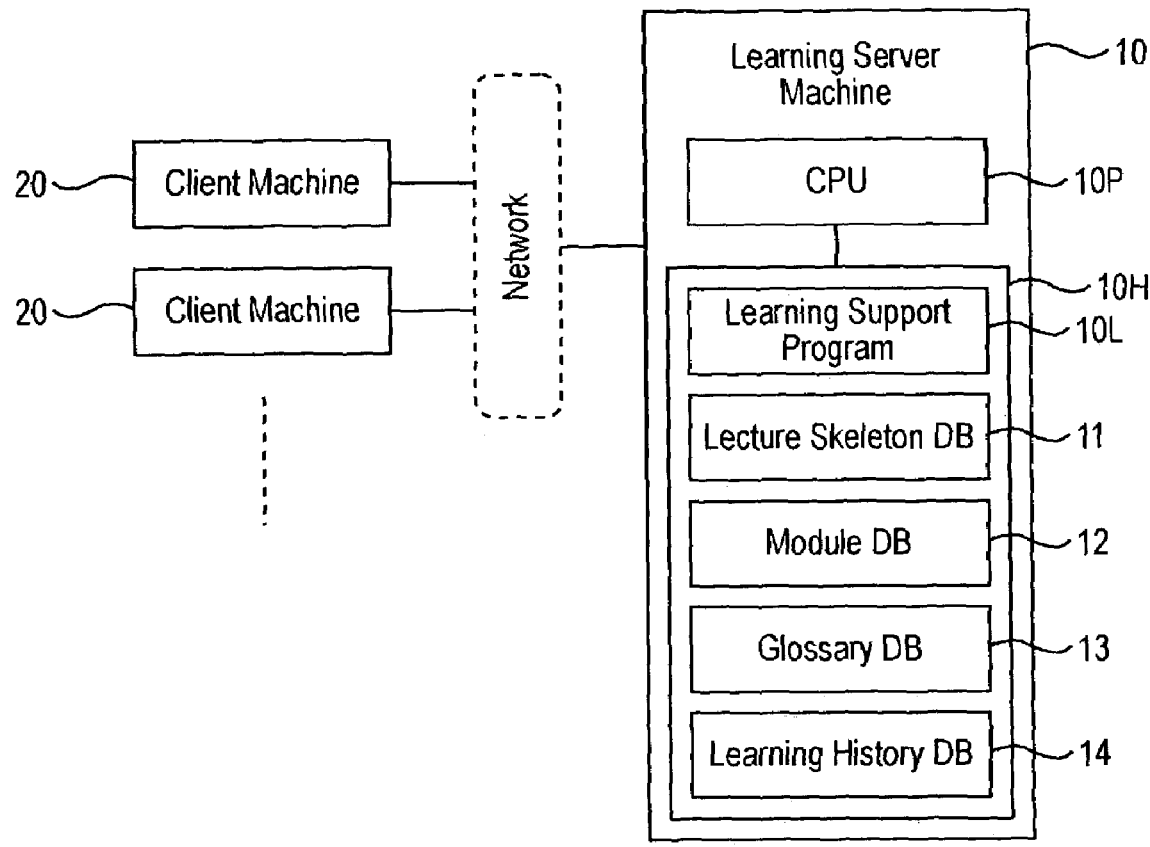
FIG. 1 is a block diagram showing the entire system of a learning support system of an embodiment according to the present invention.
FIG. 2 is a table showing a data layout of a skeleton DB.

An embodiment of the present invention will be described with reference to the drawings. FIG. 1 is a block diagram of the entire system including a learning server machine 10 of the embodiment. The learning server machine 10 is a server computer located in an e-learning center and it can connect to a plurality of client machines 20 through a network such as the Internet.

Further, the learning server machine 10 is provided with a CPU 10P and a memory portion (storage) 10H having a hard disk and a memory that are connected to the CPU 10P. A learning support program 10L is installed in the memory portion 10H, being read and executed by the CPU 10P. The learning support program 10L provides a Web server function and executes a server side process and a process described below with reference to FIGS. 10 to 12.

For example, the client machine 20 consists of a personal computer in which a Web browser program is installed. A learner can attend a learning course supplied by the learning server machine 10 by accessing to the learning server machine 10 from a client machine 20.

A learning material used in a learning course includes a plurality of modules. The contents of a learning material are arranged in a hierarchical format of "chapter", "paragraph", "section" and "item". The module includes contents corresponding to the section or the item. Learning materials of learning courses are managed by a skeleton DB 11 and a module DB 12 stored in the memory portion 10H of the learning server machine 10.

FIG. 2 shows a data layout of the skeleton DB 11. The skeleton DB 11 contains a plurality of records that are created for respective learning courses provided by the learning server machine 10, and each record includes fields of "Learning Course Title", "Presupposed Keyword" and "Learning Keyword". A title of the learning course is stored in the "Learning Course Title" field. Keywords of the subjects that should have been acquired by a learner before attending the corresponding learning course are stored in the "Presupposed Keyword" field. The "Learning Keyword" field is prepared for each chapter of the corresponding learning courses, storing keywords of subjects that will be acquired by attending the corresponding chapter. Hereinafter, the keywords stored in the "Presupposed Keyword" field and the "Learning Keyword" filed are referred to as presupposed keywords and leaning keywords, respectively.

FIG. 3 shows a data layout of the module DB 12. The module DB 12 contains a plurality of records created for the respective module, and each record includes fields of "Module ID", "Module Name", "Learning Time", "Learning Keyword", "Presupposed Keyword" and "Entity".

An ID number uniquely given to a corresponding module is stored in the "Module ID" field. A name of the module is stored in the "Module Name" field. Standard time required learning the corresponding module is stored in the "Learning Time" field. Keywords of subjects that will be acquired by learning the corresponding module are stored in the "Learning Keyword" field. Keywords of the subjects that should have been acquired by a before learning the corresponding module are stored in the "Presupposed Keyword" field. The contents such as image data, text data and voice data of the corresponding module are stored in the "Entity" field.

Further, a glossary DB 13 whose data layout is shown in FIG. 4 is stored in the memory portion 10H. The glossary DB 13 contains a plurality of records that are created for the respective keywords corresponding to contents explained in the learning materials of each learning course. Each record includes fields of "Keyword" for storing a corresponding keyword and "Explanation" for storing an explanation with respect to the corresponding keyword.

As a learner accesses the learning server machine 10 from the client machine 20 to progress learning, the learning server machine 10 stores a learning history of the learner into a learning history DB 14 installed in the memory portion 10H. The learning history DB 14 includes a plurality of records created for the respective learners. As shown in FIG. 5, a record of the learning history DB 14 contains a "Learner ID" field and a plurality of sets of fields of "Acquired Keyword", "Date and Time of Learning" and "Acquired Method". A learner ID that is uniquely given to a corresponding learner is stored in the "Learner ID" field.

A keyword about a subject that has been already acquired by a learner is stored in the "Acquired Keyword" field. Each "Acquired keyword" field contains only one acquired keyword. Date and Time when a learner studied the subject indicated by the corresponding "Acquired keyword" are stored in the "Date and Time of Learning" field. When a learner has learned the subject indicated by the acquired keyword in practice, a value "0" is stored in the corresponding "Acquired Method" field. On the other hand, when a learner does not have learned the subject but requested to be treated as learned, a value "1" is stored in the corresponding "Acquired Method" field.

The learning server machine 10 refers to the learning history DB 14 to obtain the learning history of the learner, selecting a module that will be learned by the learner dynamically in consideration of the obtained learning history, when the learner requests to attend the learning course. The process executed by the learning server machine 10 to select a module will be described with reference to FIG. 6 through FIG. 9.

Figure 6:
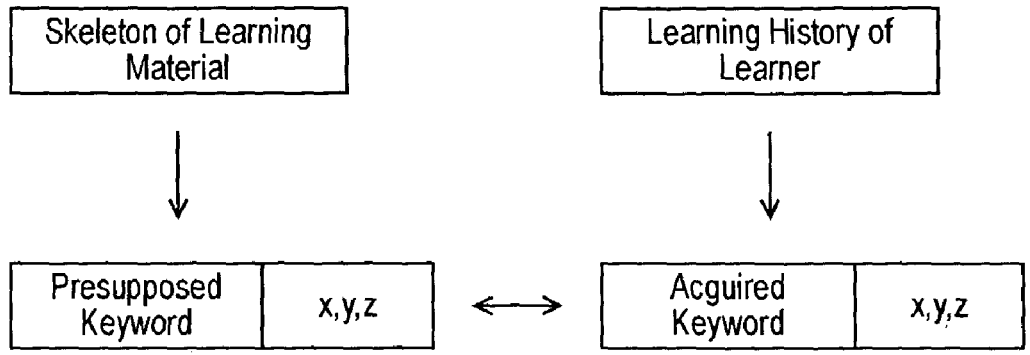
FIG. 6 is a chart showing a comparison between presupposed keywords of a learning course and acquired keywords of a learner.

When a learner selects a desired learning course by accessing the learning server machine 10 from a client machine 20, the learning server machine 10, as shown in FIG. 6, compares the presupposed keywords corresponding to a learning course that will be attended by the learner with the acquired keywords that have been already learned by the learner. When few presupposed keywords match the acquired keywords of the learner, the learning server machine 10 determines that the learning course is too difficult for the learner, transmitting guidance information to the client machine 20 to recommend another learning course. On the other hand, when many presupposed keywords match the acquired keywords of the learner, the learning server machine 10 accepts attending the learning course.

Accepting the attendance, the learning server machine 10 provides subjects corresponding to the presupposed keywords that are defined for the chapter of the learning course attended by a learner. The learning server machine 10 provides the subjects corresponding to the learning keywords that do not overlap with the acquired keywords of the learner so that the learner will not repeat learning of the acquired subjects.

The learning server machine 10 selects a module that can be learned by a learner, transmitting the selected module to the client machine 20. Specifically, the learning server machine 10 selects a target module whose presupposed keyword matches the acquired keyword of the learner among candidate modules that include the learning keyword.

Figure 7:
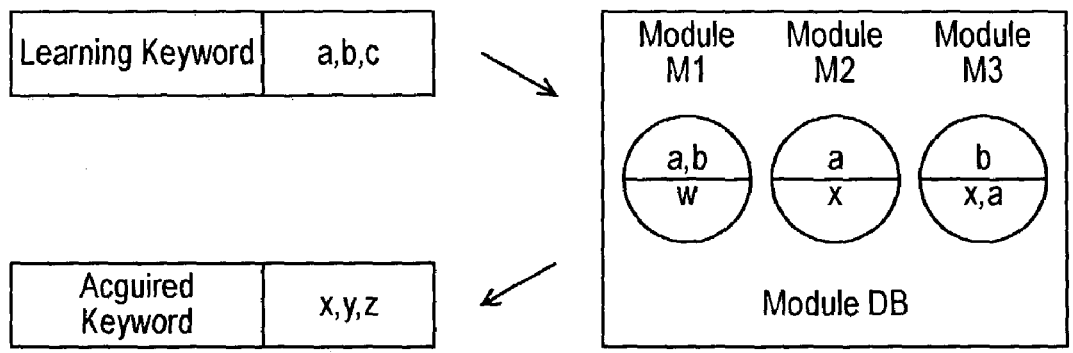
FIG. 7 is a chart showing a selection of a module.
Figure 8:
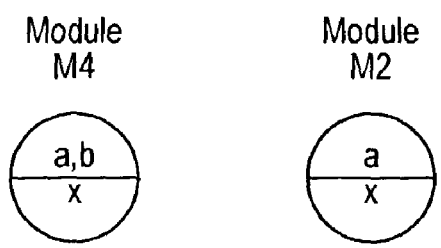
FIG. 8 is a chart showing priority of the modules to be selected.

FIG. 7 shows the selection of a module. The module DB contains modules M1, M2 and M3 as indicated by three circles. The learning keywords are indicated in the upper sections of the circles and the presupposed keywords are indicated in the lower sections thereof. The module M1, M2 and M3 include the learning keywords "a, b", "a" and "b", respectively. Accordingly, when the learning keywords are "a", "b" and "c", the module M1, M2 and M3 become the candidate modules that include the learning keywords.

However, since the presupposed keyword of the module M1 is "w" that is not included in the acquired keywords of the learner, the module M1 is not selected. Further, the presupposed keywords of the module M3 are "x" and "a", and "a" is not included in the acquired keywords of the learner. Therefore, the module M3 is not selected at this time. On the other hand, since the presupposed keyword of the module M2 is "x" that is included in the acquired keyword of the learner, the module M2 is selected as the target module that can be learned.

The learner finishing the module M2, the learning keyword "a" of the module M2 becomes the acquired keyword of the learner. Therefore, the module M3 whose presupposed keywords are "x" and "a" can be a target module after finishing the module M2. The learner can acquire the subjects corresponding to the learning keywords "a" and "b" by learning the modules M3 and M2. The remaining learning keyword "c" will be learned by selecting a module in the same manner.

If there are a plurality of candidate modules, a module with more learning keywords is given priority in selection of the target module. For instance, the candidate modules include modules M4 and M2 shown in FIG. 8, the module M4 should be selected.

Figure 9:
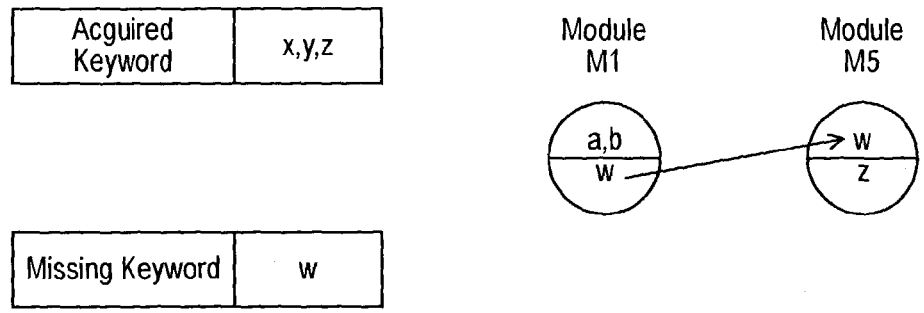
FIG. 9 is a chart showing a selection of a module in default of the optimum module.

Further, if no module satisfies the requirement, the learning server machine 10 executes a process shown in FIG. 9. Since the presupposed keyword of module M1 is "w", the module M1 cannot be learned by a learner who has not acquired the subject corresponding to the keyword "w". Thus, the learning server machine 10 selects a module M5 whose learning keywords include a missing keyword "w" and whose presupposed keyword "z" has been learned by the learner. After finishing the module M5, the learner is able to learn the module M1.

As described above, the learning server machine 10 searches modules whose learning keywords match the learning keywords of the learning course, selecting the module whose presupposed keywords match the acquired keywords of a learner. The learner studies the selected module. However, if there is no module whose presupposed keywords match the acquired keyword of the learner, the learning server machine 10 searches a module whose learning keywords includes the missing keyword and whose presupposed keywords match the acquired keywords of the learner. The modules that are optimum to learn the subjects corresponding to the learning keywords of the learning course attended by a learner are sequentially selected and provided to the learner by repeating the search. The learner studies effectively by learning the modules that are dynamically selected in response to his or her learning history.

Figure 11:
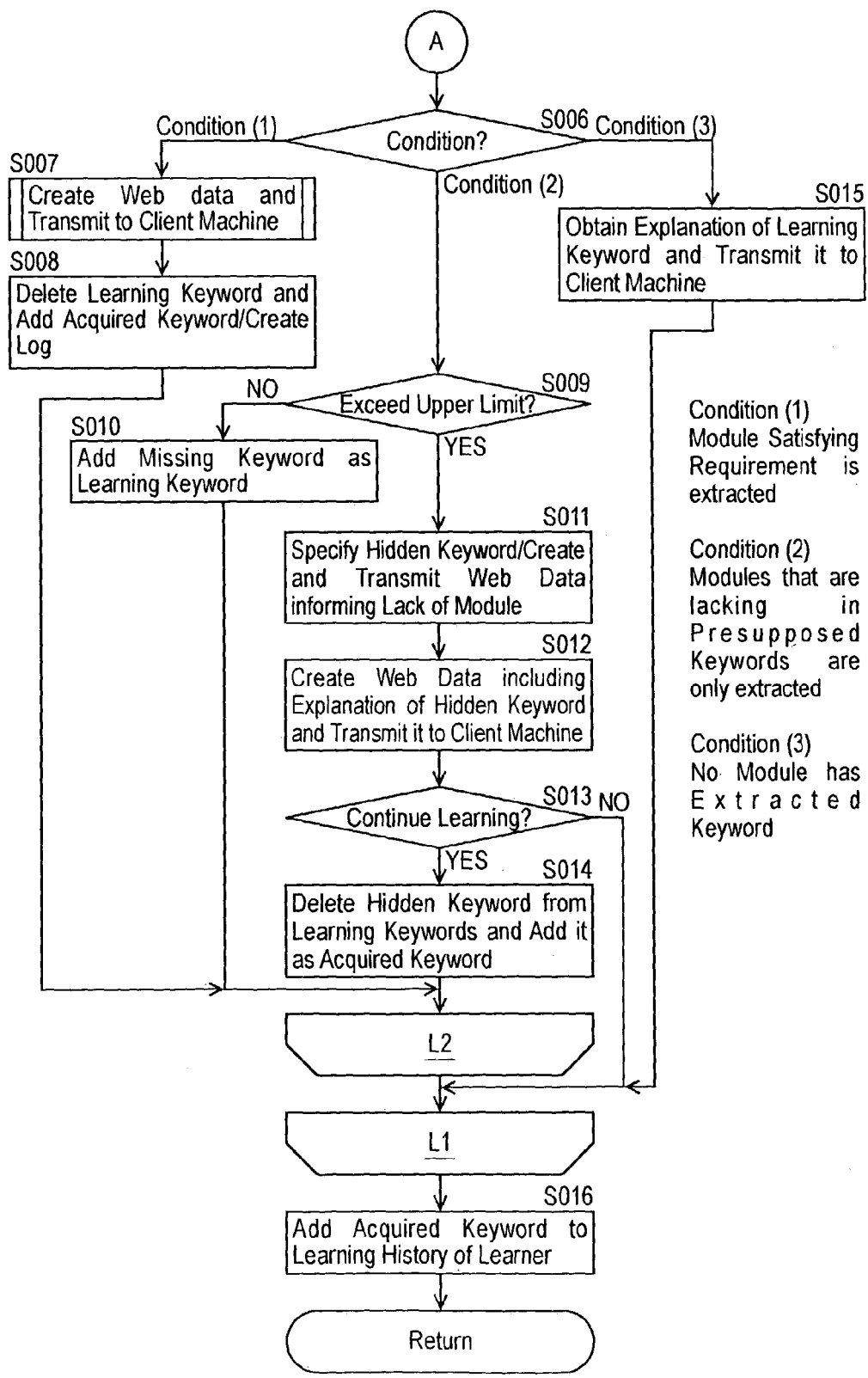
Figure 12:
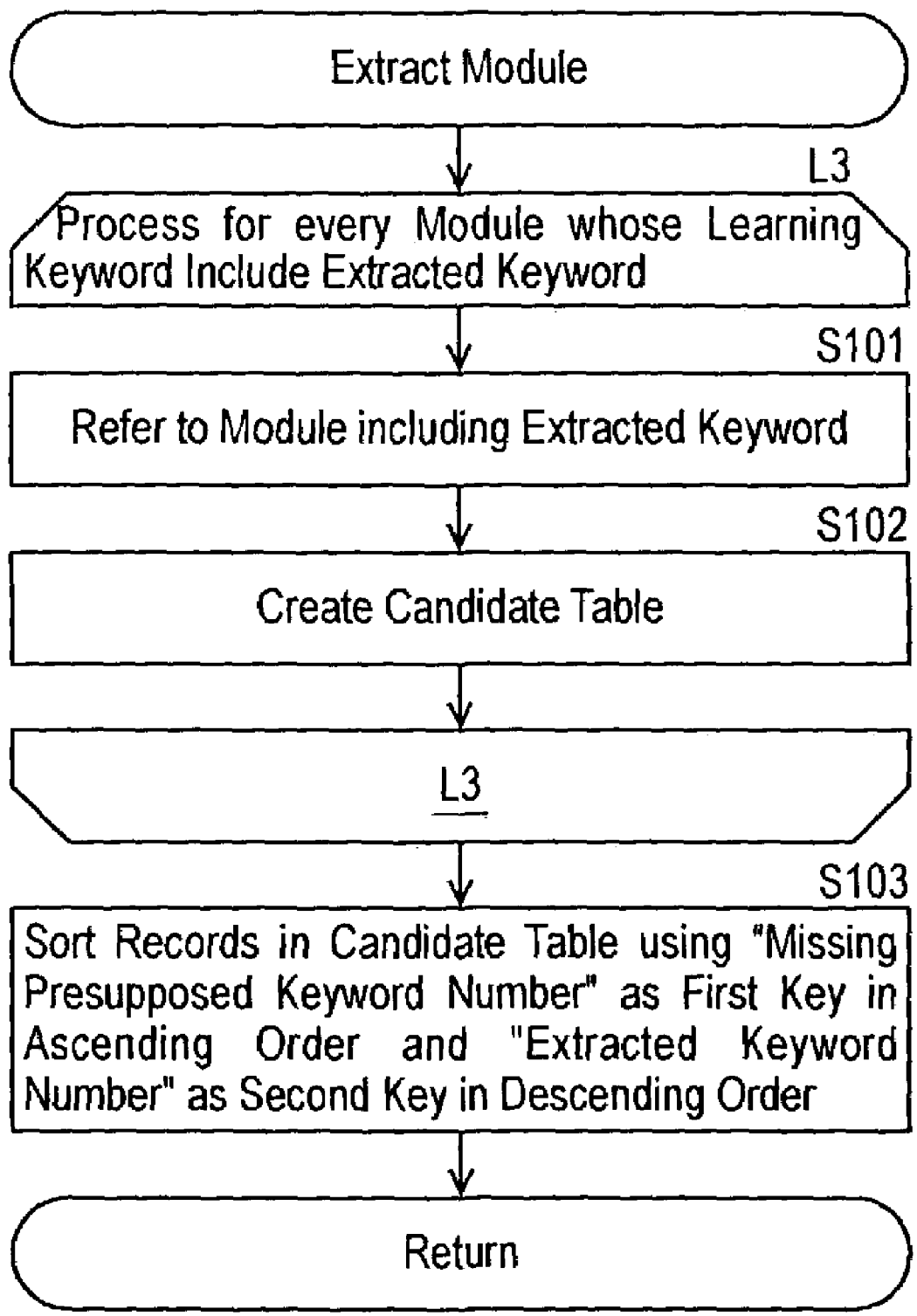
FIG. 12 is a flowchart showing a detailed process of S005 in FIG. 10.

The above process will be described in detail with reference to flowcharts shown in FIG. 10 through FIG. 12. The process of the flowchart shown in FIG. 10 starts when a learner accesses the learning server machine 10 by operating the client machine 20.

Figure 10:
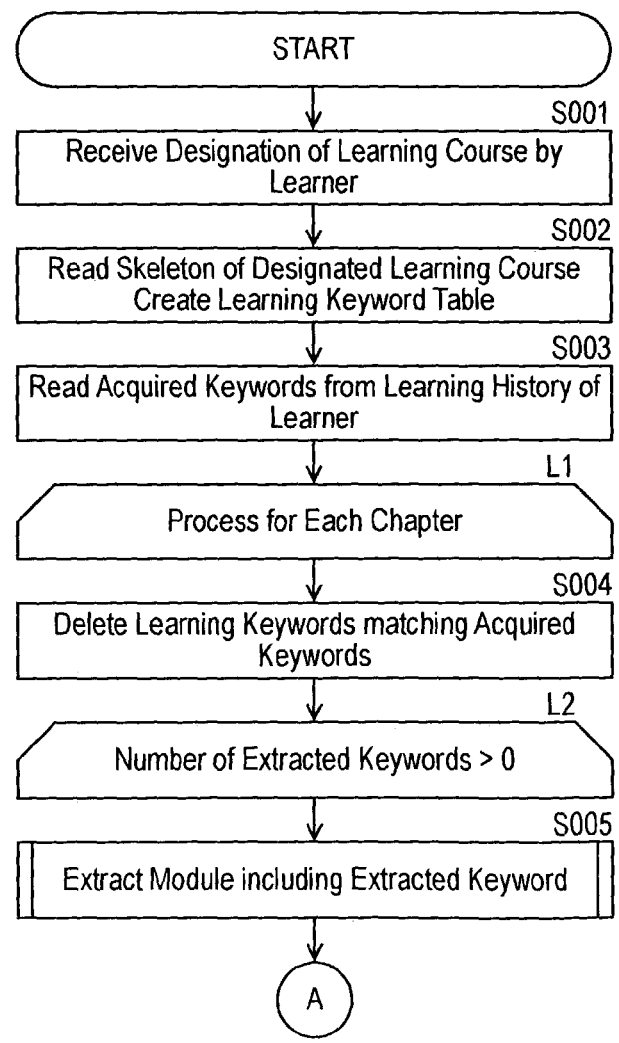
FIG. 10 and FIG. 11 are flowcharts showing the learning support method of the embodiment.

At S001 in FIG. 10, the learning server machine 10 receives designation of a learning course by a learner. Specifically, the learning server machine 10 transmits Web data including a list of learning courses to the client machine 20 in order to make the client machine 20 display the Web page. Then, the learner designating a desired learning course based on the Web page, information about the designation is transmitted to the learning server machine 10. The learning server machine 10 receives the designation of the learning course by obtaining the transmitted information from the client machine 20.

Next, at S002, the learning server machine 10 refers to the skeleton DB 11 to read the record corresponding to the learning course designated at S001, creating a learning keyword table 15 shown in FIG. 13 for each chapter. The learning keyword table 15 contains the learning keywords of the corresponding chapter. An attribute of a learning keyword contained in the learning keyword table 15 is set as "0". The attribute "0" means that the corresponding learning keyword is read from the skeleton DB 11.

Next, at S003, the learning server machine 10 refers to the learning history DB 14 to read the record corresponding to the learning course designated at S001, creating an acquired keyword table 16 shown in FIG. 14. The acquired keyword table 16 contains the acquired keywords of the corresponding learner. A registration flag of an acquired keyword contained in the acquired keyword table 16 is set as "0". The registration flag "0" means that the corresponding acquired keyword is read from the learning history DB 14.

Then the learning server machine 10 executes a process of a first loop L1. The first loop L1 is sequentially executed for each chapter.

At S004 in the first loop L1, the learning server machine 10 temporally deletes the learning keywords of the current chapter that match the acquired keywords of the learner in the learning keyword table 15. Specifically, the learning server machine 10 refers to the learning keyword table 15 created at S002 to find the learning keyword that matches any one of the acquired keywords defined in the acquired keyword table 16 created at S003. If a matched learning keyword is found, the learning server machine 10 sets "1" on a corresponding deletion flag. The deletion flags corresponding to the other learning keywords are set to "0". The learning keywords whose deletion flags are "0" in the learning keyword table 15 correspond to the subjects that should be learned by the learner and are referred to as extracted keywords.

Next, the learning server machine 10 executes a process of a second loop L2. The process of the second loop L2 repeats until the number of the extracted keywords becomes "0". That is, the process continues until the learning keyword table 15 has no learning keywords whose deletion flags are "0".

At S005 in the second loop L2, the learning server machine 10 refers to the module DB 12 to extract the records whose "Learning Keyword" fields include the extracted keyword, creating a candidate table 17 corresponding to the extracted modules. FIG. 12 shows a flowchart that describes the process at S005 in FIG. 10 in detail. Starting the process of FIG. 12, the learning server machine 10 executes a process of a third loop L3. The process in the third loop L3 is sequentially executed for every record whose "Learning Keyword" field includes the extracted keyword in the module DB 12.

At S101 in the third loop L3, the learning server machine 10 refers to the current record among the records whose "Learning Keyword" field includes the extracted keyword in the module DB 12.

Next, at S102, the learning server machine 10 creates records of the candidate table 17 shown in FIG. 15 based on the record in the module DB 12 referred at S101. A record of the candidate table 17 includes a "Module ID" field in which a module ID of the corresponding module is stored, a "Missing Presupposed Keyword Number" field and an "Extracted Keyword Number" field. A number of the presupposed keywords of the current module that are not included in the acquired keyword table 16 is stored in the "Missing Presupposed Keyword number" field. A number of the learning keywords of the current module that match any one of the extracted keywords is stored in the "Extracted Keyword Number" field.

After the learning server machine 10 finishes the processes at S101 and S102 for all records in the module DB 12 whose "Learning Keyword" fields include the extracted keyword (after the all processes in the third loop L3 finishes), the learning server machine 10 sorts all records in the candidate table 17 created at S102 (S193). The records are sorted using the "Missing Presupposed Keyword Number" field in the candidate table 17 as a first key in ascending order and the "Extracted Keyword Number" field as a second key in descending order. After the process at S103, the process in FIG. 12 finishes. The end of the process in FIG. 12 means that the process at S505 in FIG. 10 finishes. Then, the learning server machine 10 proceeds with the process to S006 in FIG. 11.

At S006, the learning server machine 10 causes the process to branch according to the modules extracted at S005. Specifically, if a record whose "Missing Presupposed Keyword number" field is "0" exists in the candidate table 17 created at S102 and sorted at S103 (Condition (1)), the learning server machine 10 judges that the module satisfying the requirement is extracted, going on the process to S007. Further, if there is no record whose "Missing Presupposed Keyword number" field is "0" in the candidate table 17 created at S102 and sorted at S103 (Condition (2)), the learning server machine 10 judges that the modules that are lacking in the presupposed keywords are only extracted, going on the process to S009. On the other hand, if a candidate table 17 was not created in the process shown in FIG. 12 (Condition (3)), the learning server machine 10 judges that there is no module having the extracted keyword, going on the process to S015.

In the case of Condition (1), the learning server machine 10 specifies the module ID of the highest order record after sorting in the candidate table 17, obtaining the entity from the module DB 12 based on the specified module ID. The learning server machine 10 further creates Web data including the obtained entity, transmitting it to the client machine 20 (S007). The client machine 20 displays the transmitted Web data as a Web page. A learner studies while watching the Web page.

The learning server machine 10 sets "1" to the deletion flag in the learning keyword table 15 corresponding to the learning keyword of the module learned by a learner at S007, adding this leaning keyword to the acquired keyword table 16 as a new acquired keyword. Further, the learning server machine 10 creates a log 18 shown in FIG. 16 and stores it into the memory portion 10H (S008). The registration flag of the acquired keyword added to the acquired keyword table 16 at S008 is set to "1". A value "1" of the registration flag means that the corresponding acquired keyword is added during the process in the flowchart of FIG. 11.

The log 18 includes fields of "Module ID", "Date and Time of Learning", "Learning Course Title", "Chapter Number", "Just Previous Module ID" and "Evaluation Value". The ID of the module that is learned by a learner at S007 is stored in the "Module ID" field. Date and time when a learner has started the learning are stored in the "Date and Time of Learning" field. The title of the learning course designated at S001 is stored in the "Learning Course Title" field. The number of chapter that is processed in the first loop L1 is stored in the "Chapter Name" field. The ID of the module that was learned at S007 in just previous round of the second loop L2 is stored in the "Just Previous Module ID" field. Learning the current module, a learner inputs an evaluation value on the Web page according to five ranks, for example. The evaluation value is transmitted from the client machine 20 to the learning server machine 10, and it is stored in the "Evaluation Vale" field of the log 18.

Finishing the process at S008, the learning server machine 10 finishes the process of the current round of the second loop L2.

In the case of Condition (2), that is, when there is no record whose "Missing Presupposed Keyword number" field is "0" in the candidate table 17, the learning server machine 10 causes the process to branch according to the number of times of the judgments as being Condition (2) at S006 in the process of the second loop L2 in the current round of the first loop L1 (S009). Specifically, when the number of judgments does not exceed the upper limit (S009, No), the learning server machine 10 adds the keywords that are not included in the learning keyword table 15 and match the presupposed keywords of the module corresponding to the highest order record after sorting in the candidate table 17 into the learning keyword table 15 (S010), finishing the process of the current round of the second loop L2. In addition, the attribute of the learning keywords added at S010 is set to "1". A value "1" of the attribute means that the corresponding learning keyword is added during the process at S010.

On the other hand, when the number of judgments exceeds the upper limit (S009, Yes), the learning server machine 10 specifies a hidden keyword that is not included in the acquired keyword table 16 and is included in the presupposed keywords of the module corresponding to the highest order record after sorting in the candidate table 17, creating Web data that informs a lack of module for learning a subject corresponding to the specified hidden keyword. Then the learning server machine 10 transmits the Web data to the client machine (S011). The client machine 20 displays the corresponding Web page to give a notice to a learner. Further, the learning server machine 10 gets the explanation of the hidden keyword from the glossary DB 13, creating Web data including the explanation and transmitting the Web data to the client machine 20 (S012). Then the client machine 20 displays the Web page including the explanation. A learner can read the explanation with respect to the current keyword.

Reading the explanation with respect to the keyword, a learner operates the client machine 20 to inform the learning server machine 10 whether the learner continues learning or not.

If the learner informs to continue learning (S013, Yes), the learning server machine 10 sets "1" to both of the "Attribute" field and the "Deletion Flag" corresponding to the hidden keyword in the learning keyword table 15, adding the hidden keyword to the acquired keyword table 16 (S014). The registration flag of the keyword added to the acquired keyword table 16 is set to "2". A value "2" of the registration flag means that the corresponding subject has not been actually learned but is considered as a learned subject for the sake of convenience of the process. Finishing the process at S014, the learning server machine 10 finishes the process of the current round of the second loop L2.

If the learner informs not to continue learning (S013, No), the learning server machine 10 causes the process to escape from the second loop L2, finishing the current round of the first loop L1.

In the case of Condition (3), that is, when the candidate table 17 has not been created, the learning server machine 10 obtains an explanation about the extracted keyword from the glossary DB 13, creating Web data including the explanation and transmitting the Web data to the client machine 20 (S015). The client machine 20 displays the corresponding Web page including the explanation. A learner can read the explanation about the keyword. The learning server machine 10 causes the process to escape from the second loop L2, finishing the current round of the first loop L1.

After the first loop L1 finishes, i.e., after the process for all of the chapters finishes, the learning server machine 10 updates the learning history DB 14 based on the acquired keyword table 16 (S016). Specifically, the learning server machine 10 adds the acquired keyword whose registration flag is "1" in the acquired keyword table 16 to the record of the learner in the learning history DB 14.

As described above, a learner can rationally and effectively study the subjects that should be acquired in the learning course with the lowest cost and the shortest period based on the modules that are dynamically selected in consideration of his or her learning history. Namely, a learner can chose the optimum combination of modules among many modules without repeatedly studying the subjects that have already learned.

Further, a manager of the learning server machine 10 can use the accumulated log 18 to develop learning materials. For instance, if the predetermined module have been valued low by many learners, the manager can correct or remake the module, which improves quality of the module.

Still further, according to the embodiment, learning material is developed in module basis, which prevents duplicated development of subjects common to learning courses. In addition, the module-basis-development disperses work load of the development.

Yet further, a manager of the learning server machine 10 can open a service even if not all modules are completely prepared. A manager can add new modules and improve existing modules while rendering the service. A new module should be created about a keyword in the glossary DB 13 that is referred by many learners.

Figure 17:
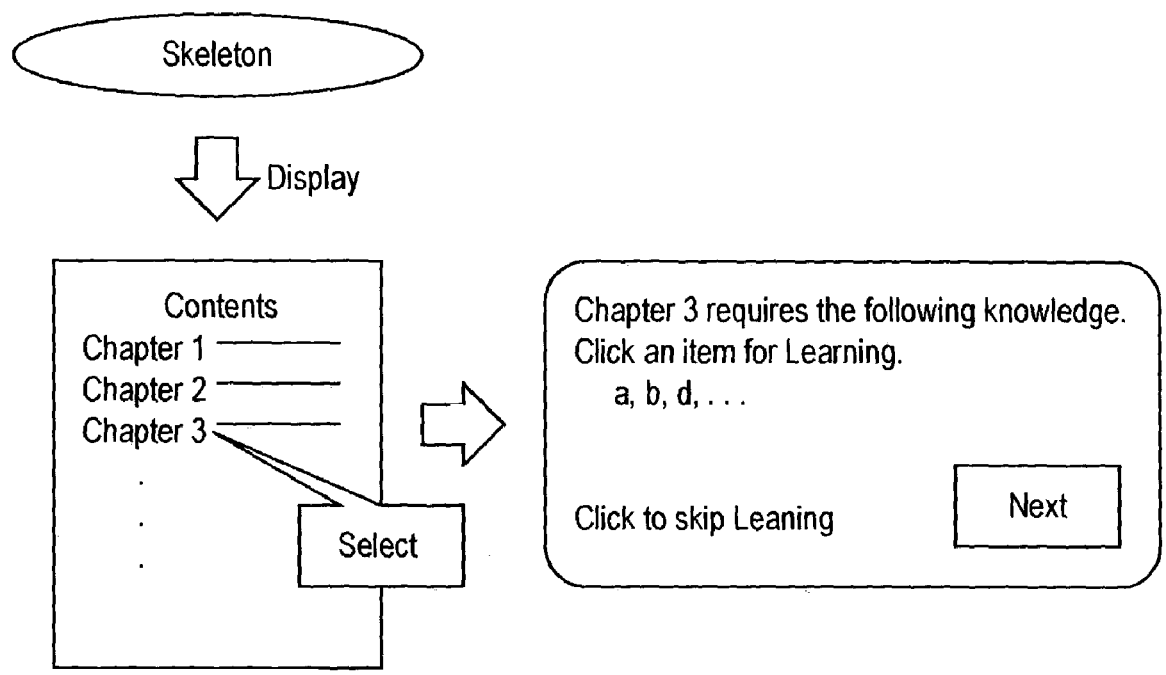
FIG. 17 is a chart showing a condition to start learning from a mid chapter.

As shown in FIG. 17, a learner can start learning from a middle chapter in a learning course. In such a case, the learning server machine 10 informs learning keywords in chapters earlier than the chapter selected by the learner that do not match the acquired keywords of the leaner to the client machine 20. The client machine 20 displays the informed learning keywords. The learner can preliminarily study the subjects about the informed learning keywords with modules selected from many modules. Alternatively, the learner can pursue learning with regarding the subjects about the informed learning keywords as learned subjects for the sake of convenience.

As described above, according to the present invention, a learner can study the contents in the learning course effectively without learning contents that have been learned again.

What is claimed is:

1. A learning support method executed by a server computer having a storage that stores module information corresponding to each of a plurality of modules of learning material, each of the modules including a plurality of subjects and wherein a subject may be taught by more than one of the plurality of modules, the method comprising:

storing presupposed keywords corresponding to each of the plurality of subjects that should have been acquired by each learner before learning each of the respective plurality of modules;

storing learning keywords corresponding to each of the plurality of subjects that should be acquired by learning each of the respective plurality of modules;

acquiring first keywords corresponding to each subject, among the plurality of subjects, which has been already learned by a learner from a client machine;

acquiring second keywords corresponding to each subject, among the plurality of subjects, which a learner wants to learn from a client machine;

comparing the first and second keywords;

extracting one or more keywords from said second keywords that do not match said first keywords as a result of the comparing; and selecting one of the plurality of modules that satisfies both first and second requirements, wherein said first requirement is that a learning keyword corresponding to a subject included in said module information matches one of the extracted keywords, and said second requirement is that a presupposed keyword included in said module information matches one of said acquired first keywords.

2. A learning support method executed by a server computer having a storage that stores skeleton information for each of a plurality of learning courses and module information corresponding to each of a plurality of modules of learning material, each of the modules including a plurality of subjects and wherein a subject may be taught by more than one of the plurality of modules, said skeleton information including one or more presupposed keywords corresponding to each of the plurality of subjects that should have been acquired by each learner before learning each of the respective plurality of modules and one or more learning keywords corresponding to each of the plurality of subjects that should be acquired by learning each of the respective plurality of modules, said module information including one or more presupposed keywords corresponding to each of the plurality of subjects that should have been acquired by each learner before beginning a learning of the module and one or more learning keywords corresponding to each of the plurality of subjects that should be acquired by learning each of the respective plurality of modules, said storage being able to store history information including one or more acquired first keywords corresponding to each subject, among the plurality of subjects, that have been learned by a learner from a client machine, and one or more acquired second keywords corresponding to each subject, among the plurality of subjects, which a learner wants to learn from a client machine, said server computer being able to connect with a client machine of a learner, said method comprising:

comparing the first and the second keywords;

extracting one or more keywords from said second keywords that do not match said first keywords as a result of the comparing;

selecting one of the plurality of modules satisfying both first and second requirements, wherein said first requirement is that a learning keyword corresponding to a subject included in said module information matches one of the extracted keywords and said second requirement is that a presupposed keyword included in said module information matches one of said acquired first keywords of said learner; and a first learning comprising:

transmitting one of the plurality of modules selected at said selecting to said client machine, and adding the learning keywords of the transmitted module to said history information as the acquired first keywords when one or more modules are found at said selecting.

3. The learning support method according to claim 2, wherein said transmitted module is chosen from the plurality of modules satisfying said first and second requirements so that a number of said learning keywords included in said module information that match learning keywords of said learning course becomes largest.

4. The learning support method according to claim 2, further comprising:
    designating missing keywords when no module satisfies both first and second requirements but one or more modules satisfy said first requirement only;
    specifying modules whose learning keywords included in said module information match one of said missing keywords and the presupposed keywords thereof match one of said acquired first keywords of said learner; and
    a second learning comprising:
        transmitting one of the modules selected from the modules specified at said specifying to said client machine, and
        adding the learning keywords of the transmitted module to said history information as the acquired first keywords when one or more modules are found at said specifying.

5. A computer-readable medium storing a learning support program to be read by a server computer having a storage that stores module information corresponding to each of a plurality of modules of learning material, each of the modules including a plurality of subjects and wherein a subject may be taught by more than one of the plurality of modules, including presupposed keywords corresponding to subjects that should have been acquired by a learner before learning each of the modules and learning keywords corresponding to subjects that should be acquired by learning the module, the program to execute a process comprising:
    acquiring first keywords corresponding to each subject, among the plurality of subjects, which has been already learned by a learner from a client machine;
    acquiring second keywords corresponding to each subject, among the plurality of subjects, which a learner wants to learn from a client machine;
    comparing the first and second keywords;
    extracting one or more keywords from said second keywords that do not match said first keywords as a result of the comparing; and
    selecting one of the plurality of modules that satisfies both first and second requirements, wherein
    said first requirement is that a learning keyword corresponding to a subject included in said module information matches one of the extracted keywords, and
    said second requirement is that a presupposed keyword included in said module information matches one of said acquired first keywords.

6. A learning support device comprising:
    a server computer having a storage in which module information corresponding to each of a plurality of modules of learning material, each of the modules including a plurality of subjects and wherein a subject may be taught by more than one of the plurality of modules, including presupposed keywords corresponding to each of the plurality of subjects that should have been acquired by each learner before learning each of the respective plurality of modules and learning keywords corresponding to each of the plurality of subjects that should be acquired by learning each of the plurality of modules are stored; and
    a learning support program stored in said storage, wherein said learning support program comprises executing a process by:
        acquiring first keywords corresponding to each subject, among the plurality of subjects, which has been already learned by a learner from a client machine;
        acquiring second keywords corresponding to each subject, among the plurality of subjects, which a learner wants to learn from a client machine;
        comparing the first and second keywords;
        extracting one or more keywords from said second keywords that do not match said first keywords as a result of the comparing; and
        selecting one of the plurality of modules that satisfies both first and second requirements, wherein said first requirement is that a learning keyword corresponding to a subject included in said module information matches one of the extracted keywords, and
    said second requirement is that a presupposed keyword included in said module information matches one of said acquired first keywords.

7. The learning support device of claim 6, wherein the learning support device creates a log containing entries for each module and stores the log in the storage.

8. The learning support device of claim 7, wherein the log entries include an evaluation value provided by each learner.

* * * * *